United States Patent [19]

Mittermaier et al.

[11] Patent Number: 4,937,773
[45] Date of Patent: Jun. 26, 1990

[54] SINE WAVE OSCILLATOR AND METHOD OF OPERATING SAME

[75] Inventors: Werner Mittermaier, Erding; Erwin Biebl, Puchheim; Thomas Maucksch, Ostermuenchen, all of Fed. Rep. of Germany

[73] Assignee: Rohde & Schwarz GmbH 7 Co. KG, Fed. Rep. of Germany

[21] Appl. No.: 266,942

[22] Filed: Nov. 3, 1988

[30] Foreign Application Priority Data

Nov. 26, 1987 [DE] Fed. Rep. of Germany ....... 3740130

[51] Int. Cl.$^5$ .............................................. G06F 1/02
[52] U.S. Cl. .................................................... 364/721
[58] Field of Search ............................... 364/718, 721

[56] References Cited

U.S. PATENT DOCUMENTS 4,285,044  8/1981  Thomas et al. ..................... 364/721

OTHER PUBLICATIONS

G. McAuliffe, "Digital Sampled Oscillator", IBM Technical Disclosure Bulletin, vol. 15, No. 4, Sep. 1972, pp. 1126–1127.
J. Tierney et al., "A Digital Frequency Synthesizer", IEEE Trans. on Audio & Electroacoustics, vol. AU–19, No. 1, Mar. 1971, pp. 48–56.
"Digital Polyphase Sinewaves," Darwood, Wireless World, Nov. 1982, p. 65.
"Accurate Sine-Wave Oscillator," Darwood, Wireless World, Jun. 1981, pp. 69–70, 78.

Primary Examiner—Gary V. Harkcom
Assistant Examiner—Long T. Nguyen
Attorney, Agent, or Firm—Hill, Van Santen, Steadman & Simpson

[57] ABSTRACT

A sine-wave oscillator produces a sine-wave signal of a digitally predetermined frequency f in successive steps by only one multiplication and one addition under control by a clock generator having a clock frequency p. During a first step the value $A_{(i+1)} = A_i + B_i \cdot k$ is determined and during a subsequent second step the value $B_{(i+1)} = B_i - A_{(i+1)} \cdot k$ is determined therefrom, $A_{(i+1)}$ and $B_{(i+1)}$ being the respective newly calculated values, $A_i$ and $B_i$ being the respective previous values calculated in a preceding step, and k being a factor $k = 2 \cdot \sin(\pi \cdot f/p)$ calculated in a computer. The period of the successive steps is selected to be $\frac{1}{2}$ p, and for the first step $A_{(o)} = 0$ and $B_{(o)} = \cos(\pi \cdot f/p)$ are selected. At least one of the two factors $A_{(i+1)}$ and $B_{(i+1)}$ is finally converted to an analog sine-wave signal in a digital-to-analog converter.

7 Claims, 1 Drawing Sheet

U.S. Patent
Jun. 26, 1990
4,937,773
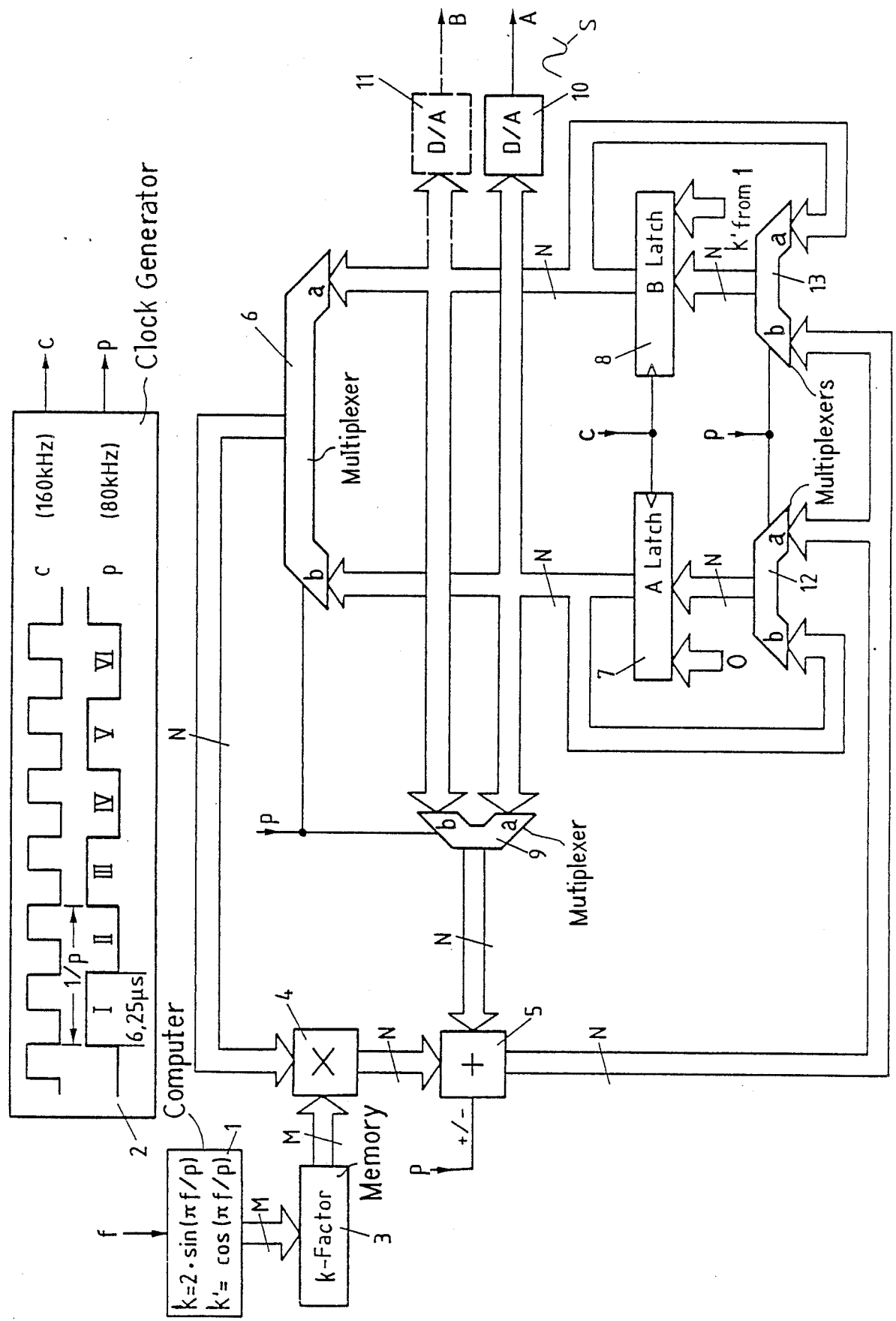

SINE WAVE OSCILLATOR AND METHOD OF OPERATING SAME

BACKGROUND OF THE INVENTION

1. Field of the Invention

The present invention is directed to a sine-wave oscillator which produces a sine-wave in successive steps, each step consisting of only one multiplication and one addition.

2. Description of the Prior Art

A sine-wave oscillator which produces a sine-wave in successive steps, each step consisting of only one multiplication and one addition is known (Wireless World, June 1981, pp. 69, 70, 78, and wireless World, Nov. 1982, p. 65). Starting from the addition therefrom of the sine, i.e., $$\sin(\omega + \Delta\omega) = \sin\omega \cdot \cos\Delta\omega + \cos\omega \cdot \sin\omega\Delta,$$

or the general relationship derived therefrom when considering a discrete point of the sine function, i.e., $$A_{(i+1)} = A_i \cdot \cos z + B_i \cdot \sin z,$$

wherein $A_i$ and $B_i$ are the respective previous sine or cosine values, and $A_{(i+1)}$ is the newly calculated sine value, and z is a factor proportional to the desired frequency f, this known sine-wave oscillator is based on the realization that for small z, $\cos z = 1$ and $\sin z = z$. With this simplification, the above relationship is reduced to $$A_{(i+1)} = A_i + B_i \cdot z.$$

From this approximate formula it is apparent that a new sine value is respectively obtained by addition of a fraction of the cosine, and in the same way a new cosine can be obtained by subtraction of a fraction of the sine. By this approximation formula the known sine-wave oscillator calculates sequentially, by means of only one multiplication step and one addition step, a new sine value $A_{(i+1)}$ and cosine value $B_{(i+1)}$ from the previous sine value $A_i$ and cosine value $B_i$, respectively, z being a fraction of the radian frequency of the desired frequency value f. The approximation formulae on which the known sine-wave oscillator is based are then, however, mathematically no longer accurate, and therefore the sine-wave signals produced by the known oscillator exhibit fundamental errors with respect to both amplitude and frequency.

SUMMARY OF THE INVENTION

It is an object of the present invention to provide a sine-wave oscillator which, while being of simple and inexpensive design, permits by only one multiplication and one addition per computation step the production of a sine-wave signal with a digitally predetermined frequency value with high accuracy without any frequency or amplitude error and with good spectral purity.

The sine-wave oscillator of the present invention operates on the above-mentioned known principle of sequentially calculating by means of only one multiplication and one addition the desired sine-wave signal, but this calculation is not based on an approximation formula, as is the case with the known sine-wave oscillator of the above-specified kind where amplitude and frequency errors have to be accepted, but is based rather on an exact derivation from the addition therefrom of the sine or the cosine. Thus, the sine-wave signal produced with the sine-wave oscillator of the invention exhibits accurate frequency and accurate amplitude as well as a high frequency resolution and good spectral purity, as can be proven from the differential equation of a harmonic oscillation by mathematical derivation. The configuration of a sine-wave oscillator according to the present invention is very simple and inexpensive, the signal quality achievable depends solely on the computation range N of the multiplier, the adder and the latches, the frequency resolution is dependent solely on the width M of the factor k which determines the frequency. Given $M = N = 24$, it is possible, for example, to achieve a harmonic and subsidiary wave interval of more than 90dB, when the frequency resolution will be $10^{-7}$. It is a further advantage of the sine-wave oscillator of the invention that due to computation of the thus produced sine and cosine oscillations with a respective time-offset by $\frac{1}{2}$ p, the phase displacement of the thus produced sine and cosine waves is exactly 90° so that sine wave signals phase-shifted by exactly 90° can be produced with the use of two separate digital-to-analog converters.

DESCRIPTION OF THE DRAWINGS

The Figure is a block diagram of an arrangement for generating a sine-wave signal S with a digitally predetermined frequency value f.

DESCRIPTION OF THE PREFERRED EMBODIMENTS

The arrangement shown in the drawing includes a computer 1 in which a frequency factor k is calculated from the frequency value f entered by the user in accordance with the relationship $$k = 2 \cdot \sin(\pi \cdot f/p) \quad (1)$$

p being the frequency of a clock generator 2 through which the successive steps of calculation are controlled and switched. The thus calculated frequency factor k is stored in a memory 3 which is coupled to one input of a multiplier 4. The multiplier 4 preferably is a parallel multiplier and thus is very fast so that preferably a plurality of successive multiplication operations can be performed within the calculation step period predetermined by the clock generator 2. The output of the multiplier 4 is coupled to an adder 5 adapted to be switched at the frequency p between an add mode and a subtract mode by the clock generator 2. The other multiplier input of the multiplier 4 is coupled via a multiplexer (switching means) 6 to the output of a latch 7 (for the "A" values) or the output of a latch 8 (for the "B" values), depending upon the state of the multiplexer 6. The outputs of both latches 7 and 8 are also coupled through a second multiplexer 9 to the other input of the adder 5. Further, the output of the latch 7 is coupled to a digital-to-analog converter 10, the output of which provides the desired analog sine-wave signal S. If an output signal which is 90° phase-shifted relative to that sine-wave signal is desired at the same time, the output of the latch 8 may optionally also be coupled to a separate second digital-to-analog converter 11. Also, the output of the latch 7 is coupled to one input of a further multiplexer 12, the other input of which is connected to the output of the adder 5, and similarly the output of the latch 8 is coupled to the input of a multiplexer 13, having another input to which the output signal from the adder 5 is likewise supplied. The multiplexers 6, 9, 12, 13 are driven via the clock generator 2 with the control signal p. The two latches 7 and 8 are also driven through a clock signal c from the clock generator. In a practical example the frequency p is 80 kHz, for example, and the clock signal c is 160 kHz. This means that the multiplexers and the adder 5 are switched in successive steps each having a period of 6.25μs. The outputs of the multiplexers 12 and 13 are coupled to the respective inputs of the latches 7 and 8. Also, the latches 7 and 8 are coupled to the computer 1 in such a way that at the start the latch 7 is set to zero and the latch 8 is set to $$B_{(o)} = \cos(\pi \cdot f/p) = k'. \quad (2)$$

$B_{(o)}$ likewise calculated in the computer 1.

Initially, the user enters the digital value of the desired frequency f in the computer 1. Then, the computer calculates the frequency factor k in accordance with equation (1) and at the same time it calculates the amplitude correction factor k' in accordance with equation (2). The frequency factor k is then stored in the memory 3 where it is available at all times. Simultaneously, the latch 7 is set to zero and the latch 8 is set to the amplitude correction factor k' according to equation (2). During this setting operating the clock generator 2 is turned off. When the clock generator 2 is turned on, the multiplexers 6, 9, 12 and 13 are switched to state "a" during a first step I. This means that the value currently held in the latch 8 is supplied via the multiplexer 6 to the input of the multiplier 4 where it is multiplied by the factor k. This product is supplied to the adder 5 to which at the same time the current output signal from the latch 7 (in this case the initial value=zero) is supplied. The adder 5 is switched to the add mode by the clock generator 2, and the thus calculated sum is supplied via the multiplexer 12 to the input of the latch 7. The value $A_i$ initially stored in the latch 7 is thereby changed to the new value $A_{(i+2)}$ calculated in step 1. During this operation the input of the latch 8 is only supplied with its own output signal via the multiplexer 13 so that the value $B_i$ remains in the latch 8.

Subsequently, in a second step II the multiplexers are switched to state "b", and in this case the output signal from the latch 7, i.e., the new value $A_{(i+1)}$ calculated in the preceding step, is supplied to the multiplier 4 where it is multiplied by k, and in the adder 5 this product is then subtracted from the value $B_i$ of the latch 8, since in the meantime during step II the adder 5 has been switched to the subtract mode by the clock generator 2. The difference appearing at the output of the adder 5 is supplied via the multiplexer 13 to the input of the latch 8 where it is held as new factor $B_{(i+1)}$. The value of the latch 7 remains unchanged; during step II the output of the latch 7 is coupled via the multiplexer 12 to the input of the latch 7. During a subsequent third step III the multiplexers are again switched to state "a", and the calculation of step I is repeated, and in a fourth step IV the calculation of step II is finally repeated, etc. The period of the alternatingly repeated steps I and II is ½ p, p being the control frequency of 80 kHz, for example, produced by the clock generator 2 and corresponding to a step period of 6.25μs. This means the multiplexers and the adders are switched every 6.25μs, and after two respective steps, i.e., after 12.5μs, the respective newly calculated factors $A_{(i+,)}$ and $B_{(i+,)}$ are available in the latches 7 and 8. Thus, the digital-to-analog converter 10 receives the respective newly calculated factor from the latch 7 every 12.5μs and produces therefrom the desired sine-wave signal S, and if an additional second digital-to-analog converter 11 is provided it will likewise receive the new factor every 12.5μs from the latch 8 to produce therefrom the desired second *analog sine-wave signal which is exactly 90° phase-shifted. Thus, in the latches 7 and 8 the desired sine-wave signal at the frequency f is digitally formed in steps of 12.5μs and then directly converted to the corresponding analog signal. The frequency p of the control signal, which determines the step period, is included in the frequency factor k in accordance with equation (1).

Depending on the frequency p and the speed of the multiplier 4, there will in most cases be sufficient time during each step to execute other additional computational operations through the multiplier 4. For instance, an additional modulation of the sine-wave signal could be calculated and converted correspondingly. Another possibility would be to calculate and produce, during each step in accordance with the above method, simultaneously and successively two or more sine-wave signals; to this end it would merely be necessary to provide additional memories 3 in which the different frequency factors k are stored and which would be coupled to the input of the adder 4 via corresponding multiplexers. Moreover, additional latches with associated multiplexers must be provided in which these respectively different sine values are held.

The entire system can be built with available components or can be composed as a so-called gate-array circuit. The latches 7 and 8 are simple known latches (temporary storages) and may be composed of D-type flip-flops. The digital-to-analog converter 10 is dimensioned in accordance with the desired resolution.

Although modifications and changes may be suggested by those skilled in the art it is the intention of the inventors to embody within the patent warranted hereon all changes and modifications as reasonably and properly come within the scope of their contribution to the art.

We claim:

1. A sine-wave oscillator for generating a sine-wave of a selected frequency f, comprising:
    a clock generator which generates a clock signal of frequency p;
    computer means into which said frequency f is entered for calculating values $k = 2 \cdot \sin(\pi f/p)$ and $K' = \cos(\pi f/p)$;
    first iterative means connected to said computer means and to said clock generator for calculating successive values $$A_{(i+1)} = A_i + B_i \cdot k;$$

means for setting $A_i = A_o = 0$ and $B_i = B_o = k'$ in said first iterative means in an initial iteration;
    second iterative means connected to said computer means and to said clock generator for calculating successive values $B_{(i+1)} = B_i - A(i+1) \cdot k$;
    said clock generator alternatingly operating said first and second iterative means for respective periods of ½p; and
    means connected to said first iterative means for converting each $A_{(i+1)}$ value into a corresponding analog sine-wave signal.

2. A sine-wave generator as claimed in claim 1 further comprising means connected to said second iterative means for converting each $B_{(i+1)}$ value into a corresponding analog sine-wave signal.

3. A sine-wave generator as claimed in claim 1, wherein said first and second iterative means share a common multiplication unit having an input connected to said computer means, and share a common addition/subtraction unit having an input connected to an output of said multiplication unit, said addition/subtraction unit having a control input connected to said clock generator to receive said clock signal therefrom to operate said addition/subtraction unit in an adding mode during operation of said first iterative means and to operate said addition/subtraction unit in a subtraction mode during operation of said second iterative means.

4. A sine-wave generator as claimed in claim 3, wherein said first iterative means includes first latch means connected to said means for setting and to an output of said addition/subtraction unit for successively storing said $A_{i+1}$ values and having an output connected to said means for converting each $A_{(i+1)}$ value into a corresponding analog sine-wave signal, and wherein said second iterative means includes second latch means connected to said means for setting and to said output of said addition/subtraction unit for successively storing said $B_{(i+1)}$ values, and having an output.

5. A sine-wave generator as claimed in claim 4, further comprising means connected to said second iterative means for converting each $B_{(i+1)}$ value into a corresponding analog sine-wave signal, and wherein said output of said second latch means is connected to said means for converting each $B_{(i+1)}$ value into a corresponding analog sine-wave signal.

6. A sine-wave generator as claimed in claim 4, wherein said first and second iterative means share a common first multiplexer having inputs respectively connected to the outputs of said first and second latch means and having an output connected to a further input of said multiplication unit, and share a common second multiplexer having inputs respectively connected to said first and second latch means and having an output connected to a further input of said addition/subtraction unit, said first and second multiplexers being connected to said clock generator to connect the output of said second latch means to said further input of said multiplication unit and to connect the output of said first latch means to said further input of said addition/subtraction unit during operation of said first iterative means, and to connect the output of said first latch means to said further input of said multiplication unit and to connect the output of said second latch means to said further input of said addition/subtraction unit during operation of said second iterative means.

7. A sine-wave generator as claimed in claim 6, wherein said first iterative means includes a third multiplexer having inputs respectively connected to an output of said addition/subtraction unit and to said output of said first latch means and having an output connected to an input of said first latch means, said third multiplexer connected to said clock generator to connect said output of said addition/subtraction unit to said input of said first latch means during operation of said first iterative means to replace a current $A_{(i+1)}$ value in said first latch means with a new $A_{(i+1)}$ value and to connected said output of said first latch means to said input of said first latch means during operation of said second iterative means to replace a current $A_{(i+1)}$ value with the same $A_{(i+1)}$ value, and wherein said second iterative means includes a fourth multiplexer having inputs respectively connected to an output of said addition/subtraction unit and to said output of said second latch means and having an output connected to an input of said second latch means, said fourth multiplexer connected to said clock generator to connect said output of said addition/subtraction unit to said input of said second latch means during operation of said second iterative means to replace a current $B_{(i+1)}$ value in said second latch means with a new $B_{(i+1)}$ value and to connected said output of said second latch means to said input of said second latch means during operation of said first iterative means to replace a current $B_{(i+1)}$ value with the same $B_{(i+1)}$ value.

* * * * *